United States Patent

[11] 3,594,008

[72] Inventors Isamu Takagi
Tokyo;
Atushi Shino, Kunitachi-shi, both of, Japan

[21] Appl. No. 761,576
[22] Filed Sept. 23, 1968
[45] Patented July 20, 1971
[73] Assignee Aiwa Co., Ltd.
Tokyo, Japan
[32] Priority Sept. 3, 1968
[33] Japan
[31] 43-55131/68

[54] MAGNETIC TAPE RECORDING AND REPRODUCING DEVICE

3 Claims, 11 Drawing Figs.

[52] U.S. Cl. .......... 274/4, 352/78, 352/168, 179/100.2, 242/199
[51] Int. Cl. .......... G11b 5/00
[50] Field of Search .......... 274/4 A, 4 B, 4 C, 4 D, 11 A, 11 B, 11 C, 11 D; 179/100.2 Z; 242/55-13; 352/78, 168

[56] References Cited

UNITED STATES PATENTS

| | | | |
|---|---|---|---|
| 3,273,815 | 9/1966 | Schuller | 274/4 (E) |
| 3,400,936 | 9/1968 | Staar | 274/4 (E) |
| 3,482,839 | 12/1969 | Wolfner | 179/100.2 (Z) |
| 3,484,110 | 12/1969 | Takemi | 179/100.2 (Z) |
| 2,184,331 | 12/1939 | Becker | 352/72 |
| 2,911,215 | 11/1959 | Cousino | 179/100.2 Z |
| 3,385,534 | 5/1968 | Staar | 242/55.13 |
| 3,395,965 | 8/1968 | Teshi | 352/221 |

*Primary Examiner*—Leonard Forman
*Assistant Examiner*—Dennis A. Dearing
*Attorney*—Birch, Swindler, McKie & Beckett ABSTRACT: A magnetic tape recording and reproducing device which is adapted to any of three types of tape cartridges that are currently standard, wherein a large tape cartridge as well as a small tape cartridge is inserted through a single entrance, the mechanisms for the small cartridge being automatically removed from the path of an incoming large cartridge when the large cartridge is inserted.

PATENTED JUL 20 1971

3,594,008

SHEET 1 OF 6

MAGNETIC TAPE RECORDING AND REPRODUCING DEVICE

This invention relates to a magnetic tape recording and reproducing device adapted for three standard types of tape cartridges.

With the outstanding tendency of ever increasing use of magnetic tape recorders and players in recent years, progress is remarkable also in the field of the magnetic tape reel. The place of the conventional open-type tape reels is now being taken by the cartridge-type tape reels, of which the most popular types are the endless four-track and eight-track types as well as the so-called reel-to-reel cassette type. Maximum dimensions of the four-track type, the eight-track type and the cassette-type cartridges are approximately 130×100×22 mm., 138×100×22 mm. and 63×100×12 mm. respectively. It will be seen that the four-track type and eight-track type are almost identical in size except that they are slightly different in length, while the so-called cassette type is less than one-half of the formers' in length and nearly one-half in thickness. Just for convenience of description, both the four-track type and the eight-track type are generally referred to as a large cartridge hereinafter, and the so-called cassette type is called a small cartridge.

Many of the conventional magnetic tape recorders or reproducers are adapted for both types of the large cartridge; that is, an apparatus adapted for both four-track and eight-track types is publicly known. However, the small cartridge can be used only with an apparatus specially designed for that type of cartridge, and a tape recorder or reproducer commonly usable for the large and small cartridges have never been designed except for a mere joining of two discrete devices into one unit. On the other hand, demand for an apparatus adapted for both large and small cartridges is now rapidly increasing as the small cartridge becomes increasingly popular.

An object of this invention is to provide a magnetic tape recording and reproducing device adapted for the large and small cartridges, that is, for any of the three types of the currently standard tape cartridges. The device of this invention is not a mere assembly of two known devices for the large cartridge and for the small one into one unit, but a consolidated combination of two sets of mechanism, making it possible for either the large or small cartridge to be easily charged into the device through the same entrance, in the same direction and in substantially the same manner.

To attain the above object, the magnetic tape recording and reproducing device of this invention is provided with a set of mechanisms for at least one type of the large cartridge and a movable set of mechanisms for the small cartridge, and characterized in that said device is constructed so that the large cartridge as well as the small cartridge is inserted through a single entrance, adjacent which are provided guide means operationally coupled with the movable supports on which said set of mechanisms for the small cartridge mounted and said guide means are selectively operated to remove said movable set of mechanisms for the small cartridge from the path of an incoming large cartridge only when the large cartridge is inserted.

According to one aspect of this invention, the above-mentioned selective operation of said guide means is caused by the fact that the large cartridge is engaged with said guide means.

According to another aspect of this invention, said device is provided with a door in front of said entrance for the cartridge, and said selective operation of said guide means is caused by opening said door widely enough to pass the large cartridge.

Though this invention is applicable to any of a magnetic tape recorder, a reproducer or a recording and reproducing device, the following explanation will be made with regard to a magnetic tape reproducing device for the convenience of the explanation.

Hereunder, this invention will be described in detail in connection with embodiments of this invention and referring to the attached drawings in which.

Figure 4A:
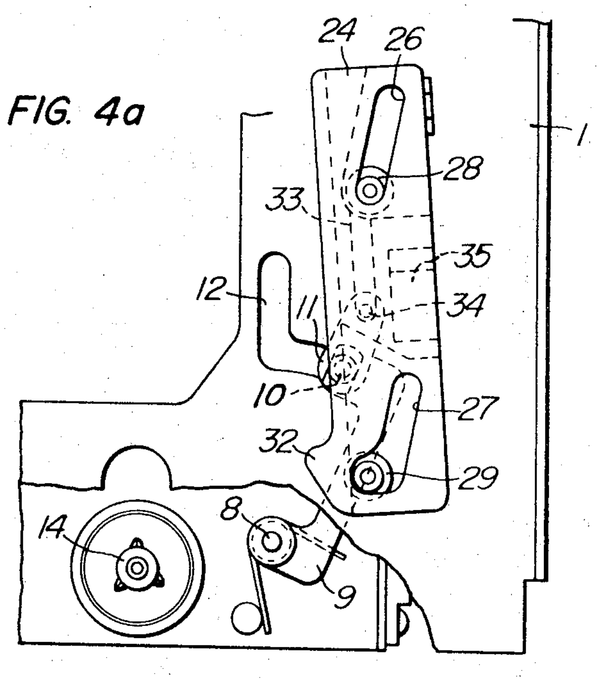
Figure 4B:
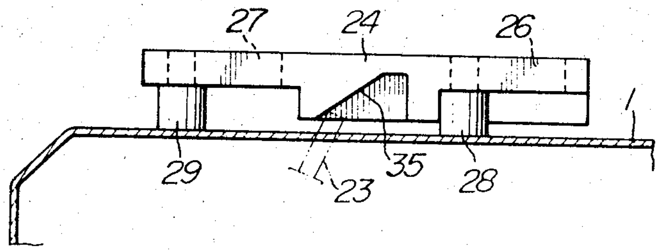
Figure 5:
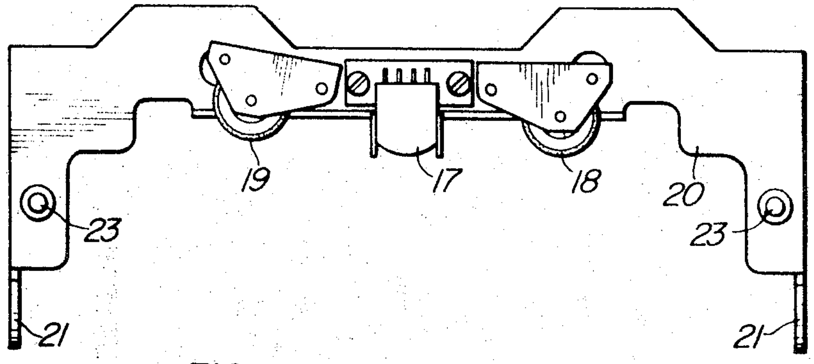
Figure 6:
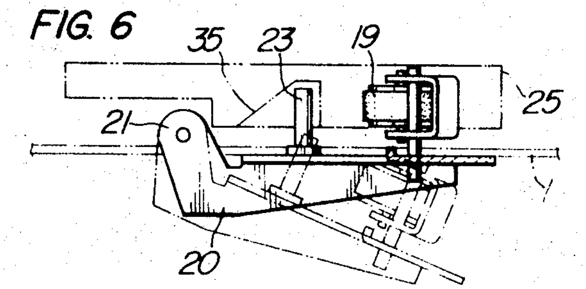
Figure 9:
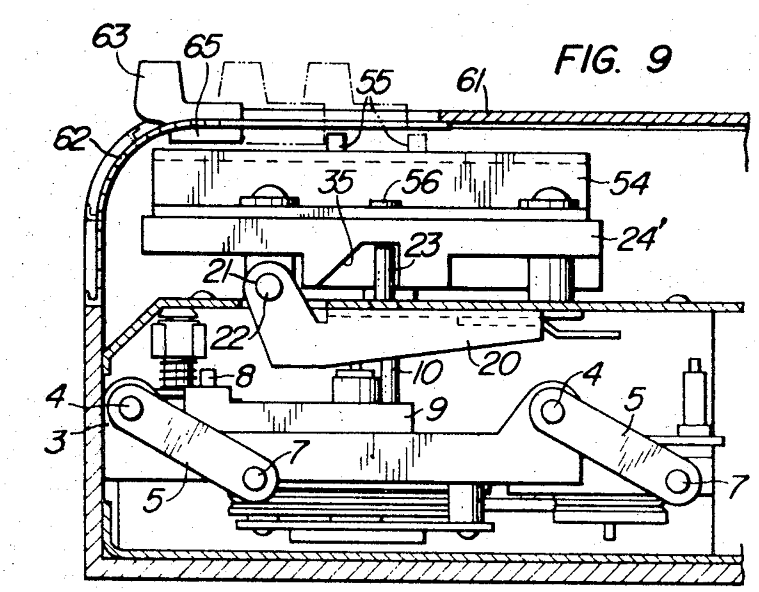
Figure 7:
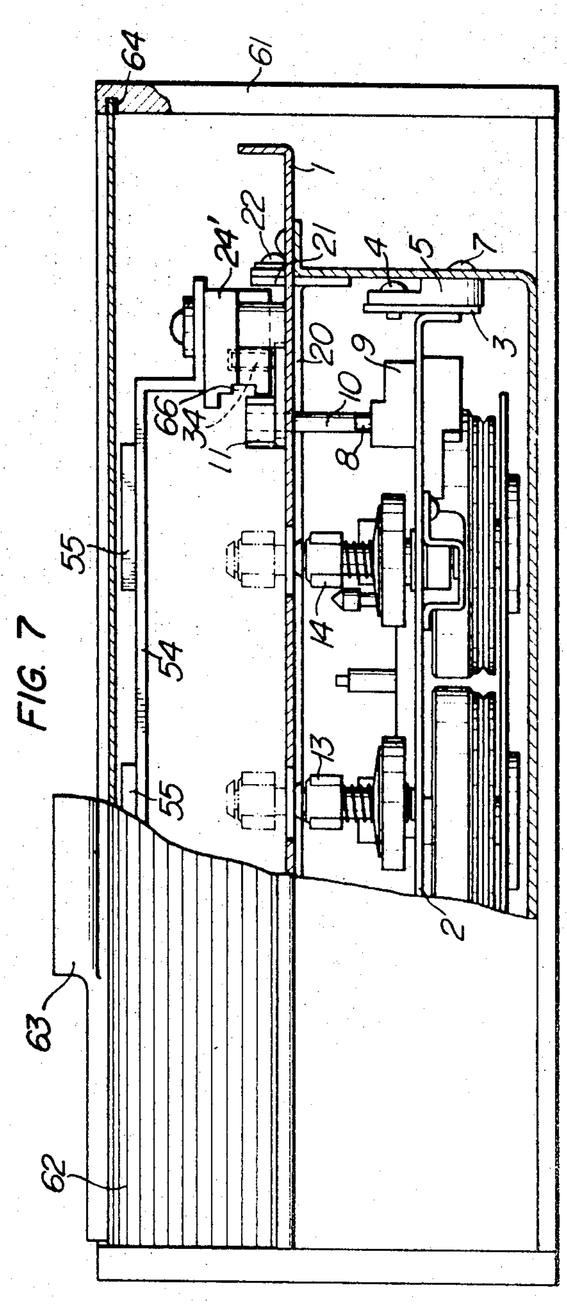
Figure 8A:
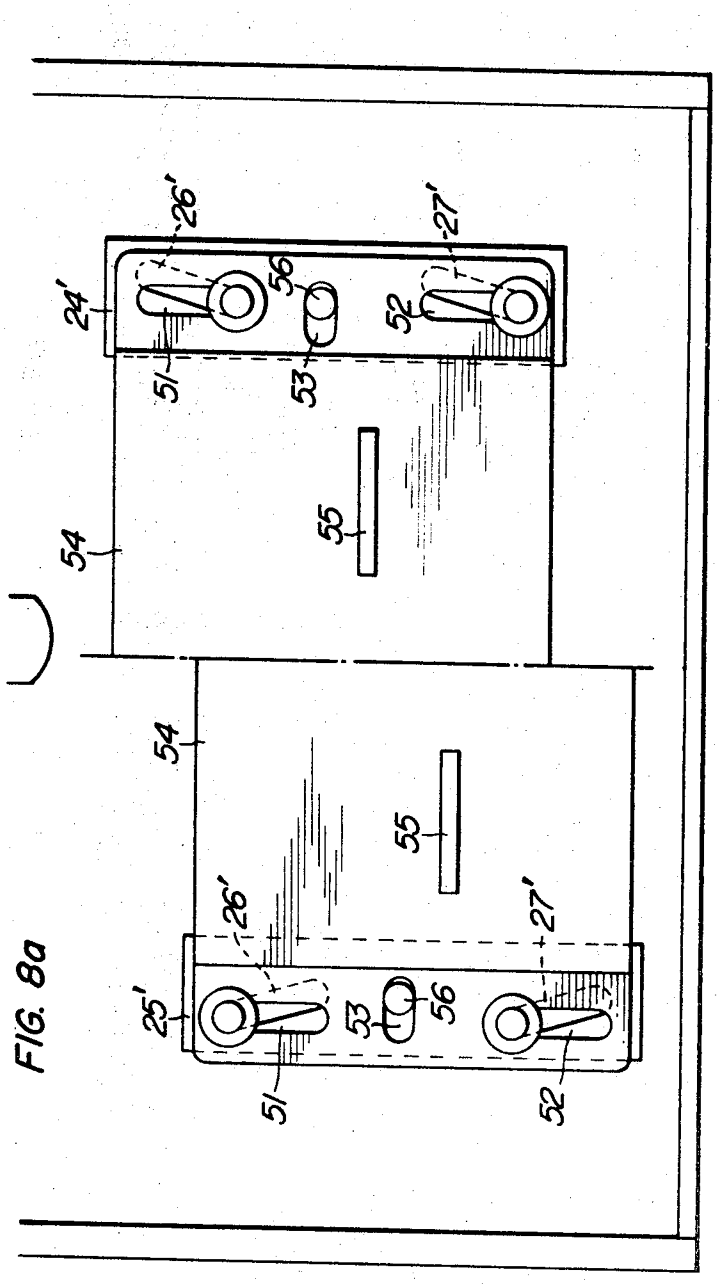
Figure 8B:
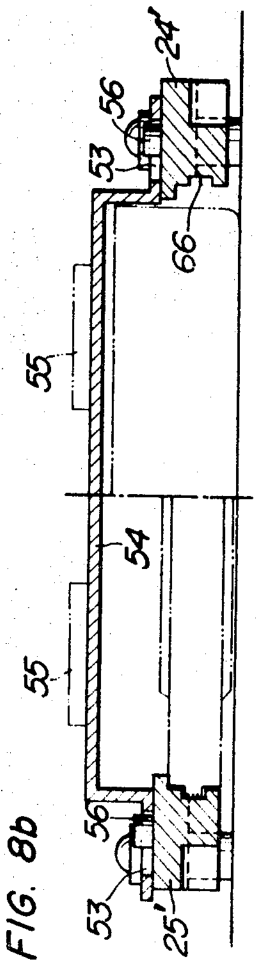

FIGS. 4*a* and 4*b* show the guide block which is an essential constituent of this invention, when it is moved to an actuated position;

FIG. 5 is a plan view of the movable base on which the reproducing head for the small cartridge is mounted and which also is an important component;

FIG. 6 is a side view of said movable base;

FIG. 7 is an elevation of another embodiment of the tape reproducing device of this invention with a part of the housing and the front side of the lower frame removed;

FIGS. 8*a* and 8*b* are a simplified plan view and elevation of the device shown in FIG. 7, intended for explanation of the operation of the guide blocks which are important constituents of this invention; and FIG. 9 is a side view of a part of the device shown in FIG. 7, the side of the housing and the side of the lower frame being removed.

Now, referring to FIGS. 1 to 6 which are related to the first one of two embodiments of this invention presented in this specification, reference numeral 1 indicates a chassis on which the whole mechanism and various components of the reproducing device are mounted. Movable frame 2 on which the driving mechanism for the small cartridge is mounted, is movably supported by means of a set of parallel links 5 which are rotatably connected to the side portions 3 of said movable frame with pivots 4 in one end and to lower frame 6 of said chassis 1 with pivots 7 in the other end. Slider 11, for example, of polyacetal, is rotatably fitted to pin 10 secured to link arm 9 which is connected to the movable frame 2 with pivot 8. The stepped lower portion of said slider 11 is fitted to L-shaped slot 12 provided in the chassis 1. Accordingly, if the slider 11 is moved forwards (upwards in FIG. 1) along the slot 12 from the position shown in FIG. 1, the moving frame 2 will be moved forwards and concurrently upwards according to the movement of the parallel links. Thus, the driving mechanism for the small cartridge mounted on the movable frame 2 will be raised so as to bring takeup shaft 13 and supply shaft 14, (though takeup and supply are reversed in return driving) above the chassis 1 through openings 15, capstan 16 also being brought up. If the force which is pushing the slider 11 forwards is removed, the movable frame 2 will be returned to its initial lowered position by the force of a spring and the gravity to retract the takeup shaft 13, the supply shaft 14 and the capstan 16 under the chassis 1. This mechanism for elevating the driving unit by means of a set of parallel links is a technique known from U.S. Pat. No. 3,385,534 to Staar, and therefore, more detailed description about this part is omitted.

Movable base 20 on which magnetic head 17 and pinch rollers 18, 19 for the small cartridge are mounted, is movably attached to the chassis 1 with pivots 22 in the bended portions 21 thereof, the upper face of said movable base 20 being normally pressed against the chassis 1 by means of a spring (not shown). Thus, the magnetic head 17 and the pinch rollers 18, 19 are normally held above the chassis 1. The movable base 20 is provided with pins 23 fixed thereto, and can be rotated about the pivots 22 in some extent by pushing down said pin 23 against the force of said unshown spring, thereby to retract said head 17 and said pinch rollers 18, 19 under the chassis 1.

Guide blocks 24, 25 which are important constituent of this invention, may be made of light and wear-resistive material such as polyacetal. As the guide blocks 24 and 25 are substantially symmetrical to each other, the following explanation will be made only about the right-hand guide block 24. The guide block 24 is provided with two slots 26 and 27 into which are fitted the stepped top portion of pillars 28 and 29 secured to the chassis 1. Cover 30 is fixed to the pillars 28 and 29 with screws to prevent the guide block 24 from coming out of said pillars. It should be noted that the guide block 24 is not tightly pressed by the cover 30 but can move horizontally being guided by the slots 26 and 27, as the top of the pillars 28 and 29 is slightly higher than the top surface of the guide block 24. The assembly consisting of the cover 30 and both guide blocks 24, 25, is pulled by spring 31 to take the position shown in FIG. 1 in the normal state. The guide block 24 is provided with a protruded portion 32 in a corner to detect the large cartridge. The small cartridge can be inserted without touching said protruded portion 32. While, the large cartridge can not be inserted unless it hits against said protruded portion 32 and pushes aside and concurrently forwards the guide blocks 24, 25. The guide block 24 is provided with a groove 33 in the bottom face, into which is fitted pin 34 fixed to the slider 11. The guide block 24 is further provided with a slanted surface in the bottom. In contact with the slanted surface 35 is the pin 23 fixed to the movable base 20. It will be seen from FIGS. 4*b* and 6 that if the guide block 24 is moved forwards, the pin 23 is accordingly pushed down by the slanted surface 35 thereby to lower the movable base 20 along with the magnetic head 17 and the pinch rollers 18, 19.

Among other components included in the reproducing device shown in FIGS. 1 to 6, reference numeral 36 indicates a retaining lever for holding an inserted large cartridge in the position, 37 a spring for urging said retaining lever 36 to the cartridge, 38 a cartridge detector for actuating motor switch 40 through link 39, numeral 41 side guide rollers, 42 a top guide roller, and 43 cartridge pushers.

Further, numeral 44 indicates a pickup head for the large cartridge, 45 a pinch roller in laid-down position, 46 a mechanism for automatically changing the position of the pickup head, and 47 a capstan for the large cartridge. As these components are not included in the essential features of this invention, more detailed description of these components will not be required.

Next, the operation of the above-described embodiment will be explained. As mentioned previously, either the small cartridge or the large cartridge including the four-track type and the eight-track type is pushed in through the single inlet in the horizontal direction, that is, the main surface of the cartridge being kept horizontally.

Figure 1:
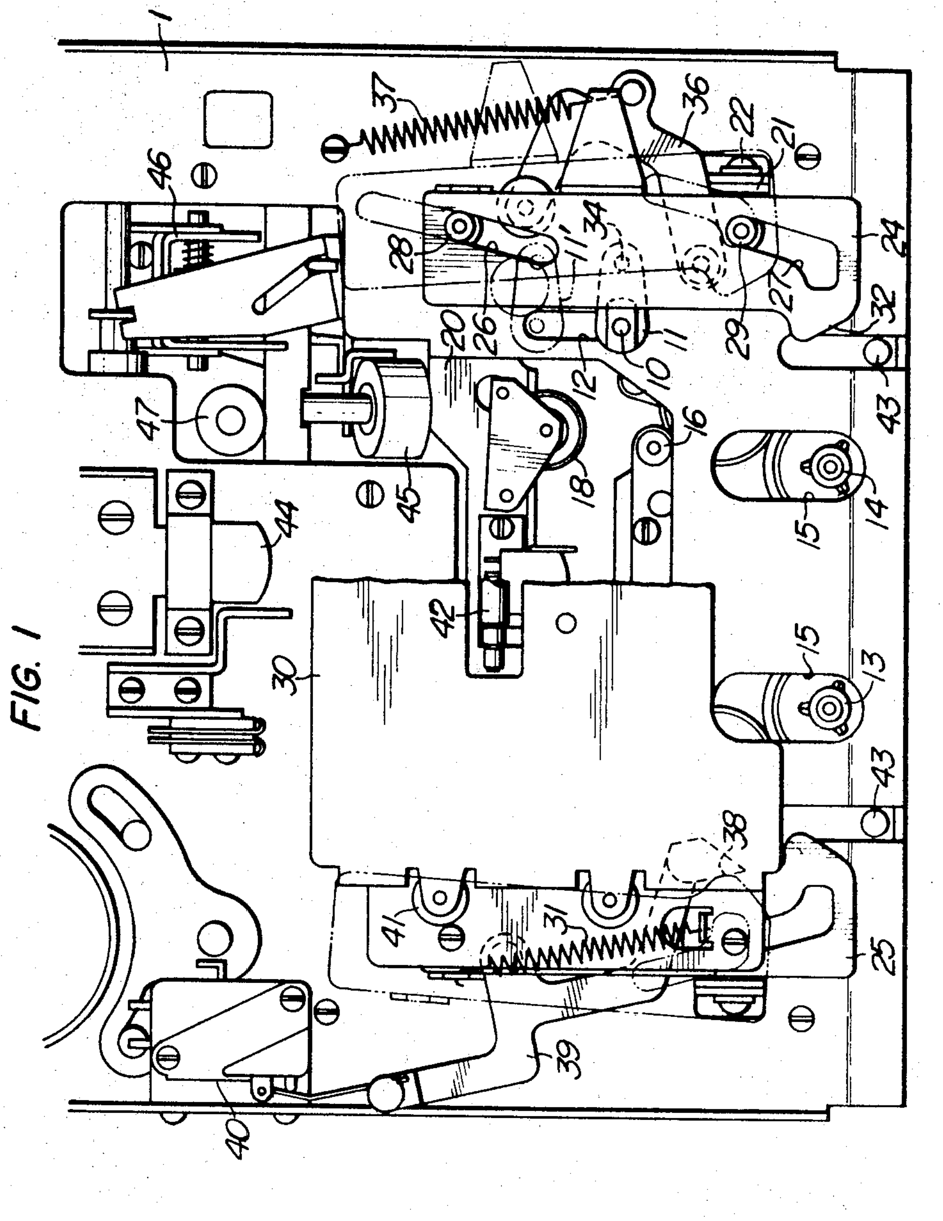
FIG. 1 is a partial plan view of an embodiment of the tape reproducing device of this invention with the cover partly removed.
Figure 2:
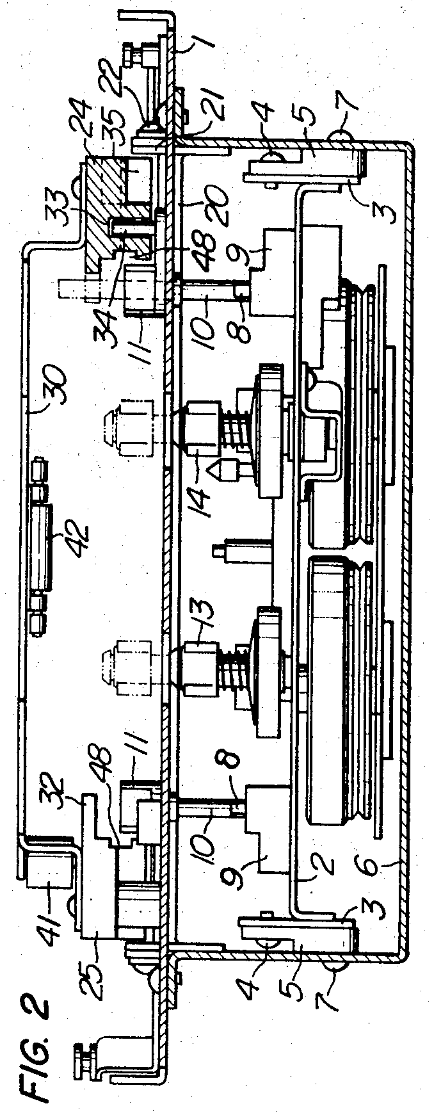
FIG. 2 is an elevation of the same device partly sectioned.
Figure 3:
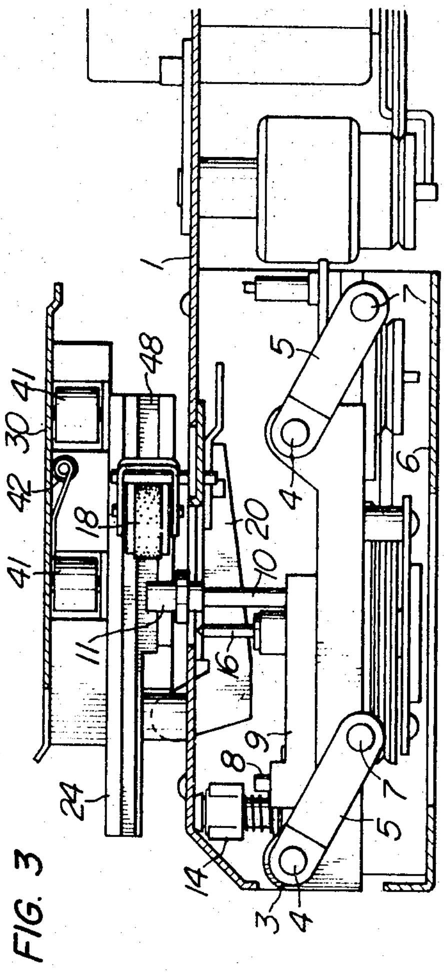
FIG. 3 is a side view of the same device with the sideplate of the lower frame removed and the upper portion partly sectioned.

Charging or insertion of the small cartridge will be explained first. When the guide blocks 24 and 25 are in the normal position as shown in FIG. 1, the mutually opposed surfaces of said guide blocks 24, 25 are parallel, and the distance between said opposed surfaces is slightly larger than the width of the small cartridge. Further, the height of the small cartridge is lower than that of the under face of the protruded portion 32 of the guide blocks 24, 25. Therefore, when the small cartridge is pushed in through the inlet, the cartridge will not contact with said protruded portion 32 and will proceed with the ribs in both sides of the cartridge being fitted in grooves 48 in said opposed surfaces of said guide block 24, 25, as far as the front edge of the cartridge hits the slider 11 which is in the way of the proceeding cartridge. Then, the slider 11 is pushed forwards along the slot 12 to the position 11′ shown in FIG. 1, being accompanied with the pin 10 which is fitted in the slider 11. As described previously, the forward movement of the pin 10 causes the movable frame 2 to rise by means of the parallel link 5. Accordingly, the takeup shaft 13, the supply shaft 14 and the capstan 16 which are mounted on said movable frame 2, move upwards and concurrently forwards to be fitted into the respective holes provided in the cartridge. At the same time, the movable frame 2 is locked to the elevated position by means of a locking mechanism (not shown). The tape in the cartridge is pinched by the capstan 16 and the pinch roller 18 and fed from one reel fitted to the shaft 14 to the other reel fitted to the shaft 13 with the rotation of the capstan 16. Meanwhile, the driving motor (not shown) is started when the cartridge hits the cartridge detector 38 which actuates the switch 40 through the link 39. Upon completion of playing, the locking mechanism is automatically detached to release the movable frame. Accordingly, the movable frame 2 drops to the lower position, taking the shafts 13 and 14 and capstan 16 off the cartridge, and the small cartridge is automatically pushed out from the previously mentioned inlet. Since this mechanism of automatically discharging the small cartridge is a technique also known from the aforementioned U.S. Pat. to Staar, detailed explanation of this mechanism will not be made.

Next, insertion of the large cartridge will be explained. Since the width of the large cartridge is greater than the distance between the opposed surfaces of the guide blocks 24 and 25 in the normal position and naturally wider than the minimum distance between the protruded portions 32 of both guide blocks 24, 25, and further, the height of the cartridge is higher than the under face of the protruded portion 32, the large cartridge hits said protruded portions 32 when it is brought to the inlet, and pushes the guide blocks 24 and 25 aside and forwards as the corner of the protruded portion 32 is slanted against the direction of insertion of the cartridge as shown in FIG. 1. Therefore, the guide blocks 24 and 25 move to the position shown in FIGS. 4*a* and 4*b*, being guided by the slots 26 and 27. As the guide block 24 is provided with a groove 33 in the bottom face to which the top of the pin 34 fixed to the slider 11 is fitted, the displacement of the guide block 24 pulls the pin 34 outwards and forwards. Accordingly, the pin 10 fitted in the slider 11 moves along the lateral branch of the L-shaped slot 12, being pulled by the pin 34 and retracted from the path of the proceeding large cartridge to a position under the guide block 24. Thus, the pin 10 displaces just laterally around the pivot 8 but does not move forwards, as it is not pushed forwards by the cartridge. Therefore, the movable frame 2 is not elevated, and the shafts 13 and 14 as well as the capstan 16 remains beneath the chassis 1 not to obstruct the insertion of the large cartridge.

As described previously, the slanted surface 35 provided in the bottom of the guide block 24 pushes down the pin 23, as the guide block 24 moves forwards. Accordingly, the movable base 20 on which said pin 23 is fixed, is turned downwards around the pivot 22, as the slanted surface 35 moves forwards. Therefore, the magnetic head 17 and the pinch rollers 18 and 19 are lowered underneath the chassis not to obstruct the insertion of the large cartridge. Thus, the large cartridge is inserted up to the playing position without being obstructed by the driving and reproducing mechanisms for the small cartridge. And, if the large cartridge is of a four-track type, the pinch roller 45 is turned up into the cartridge through the hole in the cartridge and presses the magnetic tape to the capstan 47. If the cartridge is of an eight-track type which is provided with a pinch roller within the cartridge, top of the retaining lever 36 is fitted into a recess in the side of the cartridge to keep the cartridge in position. The reproduction can be stopped any time just by pulling out the cartridge in the case of the eight-track type. While, with the four-track type, a pushbutton must be depressed to turn down the pinch roller 45 before the cartridge is pulled out. However, since this mechanism for tape playing adapted for two types of the large cartridge is a known art, more detailed description of the operation is omitted.

FIGS. 7 to 9 shown another embodiment of the magnetic tape reproducing device of this invention. In this embodiment, a shutter is provided in front of the entrance for the cartridge for the purpose of protecting the device from dust. Accordingly, the shutter must be opened before a cartridge can be inserted into the device. Though the small cartridge can be inserted with the shutter half-opened, the large cartridge can be charged only when the shutter is full opened, as the latter cartridge is nearly twice as large as the former one in height. This difference in the opening width of the shutter is utilized to effect the adaption of the device to either of the small cartridge or the large one, said shutter being operationally coupled with guide blocks similar to but more simple shaped than the ones used in the first embodiment.

In FIGS. 7 to 9, some of the components which are not directly related to the features of this invention, are not shown just for simplicity of the drawing. Corresponding reference numerals indicate corresponding components or elements in FIGS. 1 to 6 and FIGS. 7 to 9.

Referring to FIGS. 7 to 9, a magnetic tape reproducing device which is substantially similar to the one shown in connection with the first embodiment excepting the guide blocks and the cover, is housed in a housing 61. At the cartridge entrance of the housing 61 is provided a shutter 62 which has a handle 63 secured thereto. By pushing said handle 63, said shutter 62 is opened, being guided by grooves 64 provided in both sides of the entrance. The front portion of the shutter 62 is constructed in the form of a closed louver so that the shutter 62 can be guided along the curved portion of said groove 64. A block 65 is fixed to the shutter 62 underneath the handle 63.

Guide blocks 24' and 25' are substantially similar to the guide blocks 24 and 25 shown in connection with the first embodiment, except that the guide blocks 24' and 25' are not provided with the protruded portions 32 but have a boss 56 rigidly fixed thereto in the top surface. A coupling plate 54 is laid upon the guide blocks 24' and 25', said boss 56 of the guide block being loosely fitted into the slot 53. The upper portions of the stepped boss 28 and 29 secured to the chassis 1 are fitted to slots 26' and 27' of the guide blocks 24' and 25' and further slots 51 and 52 of the coupling plate 54. On the tops of the stepped bosses 28 and 29 are secured washers with screws to prevent the coupling plate 54 and the guide blocks 24' and 25' from coming off. As the stepped portion of the bosses 28 and 29 is made to be slightly longer than the combined thickness of the guide block and the coupling plate, lest the washer should press the assembly of the guide block and the coupling plate, the guide blocks 24' and 25' as well as the coupling plate 54 can slide horizontally within the limitation of the respective slots. Each of the guide blocks 24' and 25' are provided with the slot 33 and the slanted surface 35 similar to those in the guide blocks in the first embodiment.

Now, charging or insertion of the small cartridge will be explained. First, the handle 63 is pushed to open the shutter 62 by about 15 mm. This height of the opening will be sufficient to insert the small cartridge whose maximum height is approximately 12 mm. Though the block 65 secured to the shutter 62 displaces with the move of said shutter 62, it comes short of the rib 55 of the coupling plate 54 with that much opening of the shutter 62. Therefore, the guide blocks 24' and 25' remain at the normal position as shown most clearly in the left half of FIG. 8*a*, regardless of this opening of the shutter 62. The mutually opposed surfaces of the guide blocks 24 and 25 are parallel and are provided with grooves 66 having the profile corresponding to that of the small cartridge, the distance between said opposed surfaces being slightly larger than the width of the small cartridge as shown in the left half of FIG. 8*b*, in which a half of the small cartridge is shown with two-dot lines. Thus, the small cartridge is easily pushed in being guided by the grooved surfaces 66 until it hits the slider 11 and pushes the latter. In the same manner as in the first embodiment, the movable frame 2 is elevated and the reproduction of the record is initiated.

Insertion of the large cartridge is performed in a manner as follows. The large cartridge can not be inserted unless the shutter 62 is opened further from the above-mentioned position of the 15 mm. opening, as the large cartridge has a height of about 22 mm. When the shutter 62 is further pushed open toward the fully opened position by means of the handle 63, the block 65 secured to the shutter hits the rib 55 rigidly fixed to the coupling plate 54 and pushes the latter plate. Accordingly, the coupling plate 54 moves, being guided by the slots 51 and 52. As the boss 36 on the guide blocks 24' and 25' is fitted in the slot 53 of the coupling plate 54, the guide blocks 24' and 25' also are forced to move under the guidance of the slots 26' and 27'. Thus, the guide blocks 24' and 25' move forwards and concurrently outwards to finally assume the position as shown in the right half of FIGS. 8*a* and 8*b*, as the slots 26' and 27' are inclined against the direction of the move of the coupling plate 54. Accordingly, the pin 34 moves outwards and forwards following the displacement of the groove 33 and pulls in the slider 11 along with the pin 10 beneath the guide block as described previously in connection with the first embodiment. Thus, the large cartridge is inserted up to the the operating position without being obstructed by the mechanisms and components for the small cartridge as described before.

It will be needless to say that the shape and the structure of the housing and the shutter as well as the mechanism for coupling the shutter to the guide blocks described above in connection to FIGS. 7 to 9, have been shown as an example and many other modifications are possible within the scope of this invention.

Further, it will be understood that instead of initiating the displacement of the guide blocks with the opening of the shutter, any manipulating device such as a lever or pushbutton can be used to move the guide blocks for the same purpose.

As described above, the magnetic tape recording and reproducing device of this invention, in which either the large cartridge or the small cartridge can be easily inserted through a single entrance, has outstanding advantages over the conventional devices in the points that it is compact in size, easy in operation and sophisticated in design.

We claim:

1. A magnetic tape recording apparatus adapted to receive either an endless reel tape cartridge or a two reel cassette tape cartridge of a relatively smaller width and height, comprising: means defining a housing containing said apparatus having a single entrance therein, said entrance being adapted to allow the passage of said endless reel or said two reel cartridge into said apparatus, first tape transport means and first magnetic means for recording and reproduction mounted in said housing and adapted to accommodate and operated with said endless reel cartridge when fully inserted, second tape transport means for driving the tape and second magnetic means for recording and reproduction adapted to accommodate said two reel cartridge, a first movable support member for supporting and moving said second tape transport from an inoperative position displaced from the entry path of said cartridge to an operative position, said operative position being such that said second tape transport is in a position for driving the tape of a two reel cassette inserted in said apparatus, engaging means for causing the first movable support to operate to move said second tape transport on its support, said engaging means being positioned so as to be engaged by a two-reel tape cartridge entering the apparatus through said entrance and adapted to move responsive thereto to move said first movable support from the inoperative to the operative position, second movable support having mounted thereon said second magnetic means, said second support being positioned in the path of entry of said endless reel cartridge, and guide means positioned adjacent said entrance and movable away therefrom upon entry of an endless reel cartridge, said guide means being coupled with said engaging means and said second movable support as to operate to remove said engaging means and said movable support to a position allowing insertion of an endless reel cartridge therepast and into an operative engagement with said first transport and magnetic means.

2. The apparatus defined in claim 1 wherein said guide means is adapted to engage with said endless reel cartridge so that said movement of said guide means is caused by entry of said endless reel cartridge into the apparatus.

3. The apparatus defined in claim 1 having in addition a door placed in front of said entrance, said door being coupled with said guide means in such a manner that the movement of said guide means is caused by opening said door as to uncover said entrance sufficiently to allow an endless reel cartridge to pass therethrough.

UNITED STATES PATENT OFFICE
CERTIFICATE OF CORRECTION

Patent No. 3,594,008 Dated July 20, 1971

Inventor(s) Isamu Takagi, et al

It is certified that error appears in the above-identified patent and that said Letters Patent are hereby corrected as shown below:

Change the priority date to read -- August 3, 1968 --.

Signed and sealed this 7th day of March 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334